June 26, 1962 G. H. LACAN 3,041,504

SWITCHBOARD ASSEMBLY

Filed May 27, 1959 6 Sheets-Sheet 1

Inventor:
Guy Henri Lacan
by Robert Henderson
Attorney

Inventor:
Guy Henri Lacan
by Robert Henderson
attorney

June 26, 1962 G. H. LACAN 3,041,504

SWITCHBOARD ASSEMBLY

Filed May 27, 1959 6 Sheets-Sheet 3

Inventor:
Guy Henri Lacan
by Robert Henderson
Attorney

June 26, 1962 G. H. LACAN 3,041,504

SWITCHBOARD ASSEMBLY

Filed May 27, 1959 6 Sheets-Sheet 4

Inventor:
Guy Henri Lacan
by Robert Henderson
Attorney

Inventor:
Guy Henri Lacan
by Robert Henderson
Attorney

Inventor:
Guy Henri Lacan
by Robert Henderson
Attorney

United States Patent Office 3,041,504
Patented June 26, 1962

3,041,504
SWITCHBOARD ASSEMBLY

Guy Henri Lacan, Saint-Germain-en-Laye, France, assignor to La Telemecanique Electrique, Nanterre, Seine, France, a company of France Filed May 27, 1959, Ser. No. 816,159
Claims priority, application France June 2, 1958
7 Claims. (Cl. 317—101)

This invention relates to electrical switchboards of the type used in installations comprising a number of units or electrical equipment in mutually controlling or cooperating relationship with one another. Such switchboards usually comprise a large number of electrical components including relays, contactors, transformers, condensers, rectifiers and other circuit components, interconnected in selective relationship by conductors. Further, such switchboards have to be interconnected with one another and/or with cable conductors leading to control stations and to the controlled units of equipment.

One of the difficulties inherent to the construction of such switchboards is known to lie in the arrangement and attachment, upon a supporting panel, of the cablage interconnecting the switchboard components between one another and with the exterior.

Moreover, conventional switchboards do not readily lend themselves to modifications in the cablage and in the units of equipment on the switchboards when such modifications may be required. Also, there is no convenient provision in them for checking and verifying the operation of the components and for replacing any defective components of apparatus.

It is a general object of this invention to provide electrical switchboards that will be free of the above drawbacks. An object is to provide switchboards wherein connecting wires will be readily insertable without any special tools with all such wires being positioned on a front face of the switchboard for convenient inspection and replacement. A further object is to provide retainer means for positively holding such conductors in position on the board without requiring any special securing means. A further object is to provide direct pluggable connections between conductors on the switchboard and active parts of electric components mounted on the switchboard. A further object is to eliminate the need for any screw connections between electrically conductive parts, and thereby do away with the ever-present risk of disconnection due to loosening of the screw threads inherent to such connections. A further object is to enable ready replacement of defective circuit components with a minimum of tooling and delay.

According to the invention, an electrical switchboard assembly comprises a supporting surface or panel having secured thereon in a rectangular checquered pattern rectangular base blocks for removable circuit components in uniformly spaced relationship so as to define between such base blocks a number of mutually rectangular channels adapted to receive therein electrical conductors interconnecting the said components, said base blocks being formed with notches along their edges adapted for engagement with respective ends of said conductors, and connector elements carried by the ends of said conductor adapted to cooperate in resilient engagement with complementary connector elements associated with apparatus components removably fittable upon said base blocks so as to be retained thereby at least by the resilient engagement between the said connector means.

In one preferred embodiment of the invention, the bases are formed with projecting edges or flanges directed toward one another, in which the notches are formed. This secures a number of additional advantages. First, the projecting sides or flanges define restrictions for the aforementioned channels receiving the conductors, whereby the latter will tend to be retained in their channels without the provision of any further retainer means. Moreover, the notches engageable with the ends of the conductors can then conveniently be formed in the said projecting sides or flanges so that the connector elements provided at the ends of the conductors may be positioned in direct alignment with the latter and be inserted into the notch with the associated conductor directed towards the outer side of the edge and normally thereto.

The connector means which are resiliently engageable between an end of the conductor and the apparatus component, are desirably provided on one side in the form of a plug pin or spade and on the other in the form of a clip. The clip may be mounted at the end of the conductor wire while the plug pin or spade may be carried on the apparatus unit that is fitted over the base. Such an arrangement however has certain disadvantages. Thus the clips that are engageable in the notches must necessarily have comparatively restricted transverse dimensions, so that the resilient portions of the clip that serve to clamp the pin inserted therein have a restricted length of travel. In view of the unavoidable manufacturing tolerances on the thickness dimension of the pins, a firm clamping grip is difficult to achieve. Moreover, in order that the clips may satisfactorily expand within the notches, the clips cannot be simply retained in the notches by a wedging action, so that auxiliary retainer means are required to prevent the clips from escaping out of the notches.

It is preferred therefore that the ends of the conductor wires be provided with pins extending in alignment with the wires and that the apparatus unit fitted over the base be provided with the clips. For retaining the pins in the notches, the pins are desirably provided with snap-fastening means which may be in the form of at least one projecting spring strip directed toward the end of the connector pin and adapted to engage the wall surface of the socket in which said pin is received.

Quite frequently in a switchboard various apparatus units have to be mounted in shunt relationship, and to provide for such connections, the notches on the sides of the bases are desirably formed with two recesses or sockets for receiving the connector means carried by the ends of respective conductor wires, while the cooperating connector means carried by the apparatus units are interconnected. This makes possible the parallel connections just mentioned, or alternatively it becomes possible to use two connector wires in common between two units of apparatus, thereby providing a doubled cross-sectional area of conductor metal, e.g. for the main busses in cases where the load currents to be handled make it desirable to provide such an increased current-carrying cross section of conductor.

In cases where the connector pins are carried at the ends of the conductors, the pins are preferably flat i.e. in the form of spades, and are disposed to extend transversely within the notches in which they are received. and the apparatus unit is provided with a dual clip cooperating with both pins.

Such dual clips, since they are not required to be received in notches and may hence be made quite large in size, are desirably provided in the form of U-shaped conductive elements insertable between the pins, the U-shaped part being surrounded by a stirrup which encloses a spring acting at one end against the stirrup and at the other end, by way of an interposed platelet, against one of the legs of the U-shaped part. Thus, after the clamp has been positioned between the two related pins, each pin is pressed on one side against an outer face of the U-shaped part, and on the other it is pressed by spring force against the side of the stirrup remote from the spring and against the platelet.

The base blocks are preferably recessed to enable convenient reception of the unit of apparatus to be fitted thereover. The removable section of such unit may support any of the delicate moving parts of the latter whilst the more rugged portions of the apparatus less susceptible to wear and breakage, may be housed within the recess in the base block. On withdrawing the removable section, the delicate elements can very easily be inspected and if necessary replaced.

Thus, in the case of such apparatus units as transformers, rectifiers, condensers, measuring instruments, timing devices, and the like, the base will simply constitute a connector-carrying casing section, while in the case of more complex units of apparatus such as relays and contactors, the base may include therein the more rugged stationary elements such as electromagnetic cores for example while the armatures, contacts, windings and the like, are all removable or form part of the removable section of the apparatus.

In the ensuing exemplary disclosure more particular reference will be made to contactors, since these are widely used, comparatively complex units of equipment frequently encountered in switchboard assemblies, so that the construction of less intricate components will be readily intelligible from the description of the features of the invention as applied to contactors.

The ensuing description of an exemplary embodiment of the invention is made with reference to the accompanying drawings, wherein.

Figures 1, 4, 5:
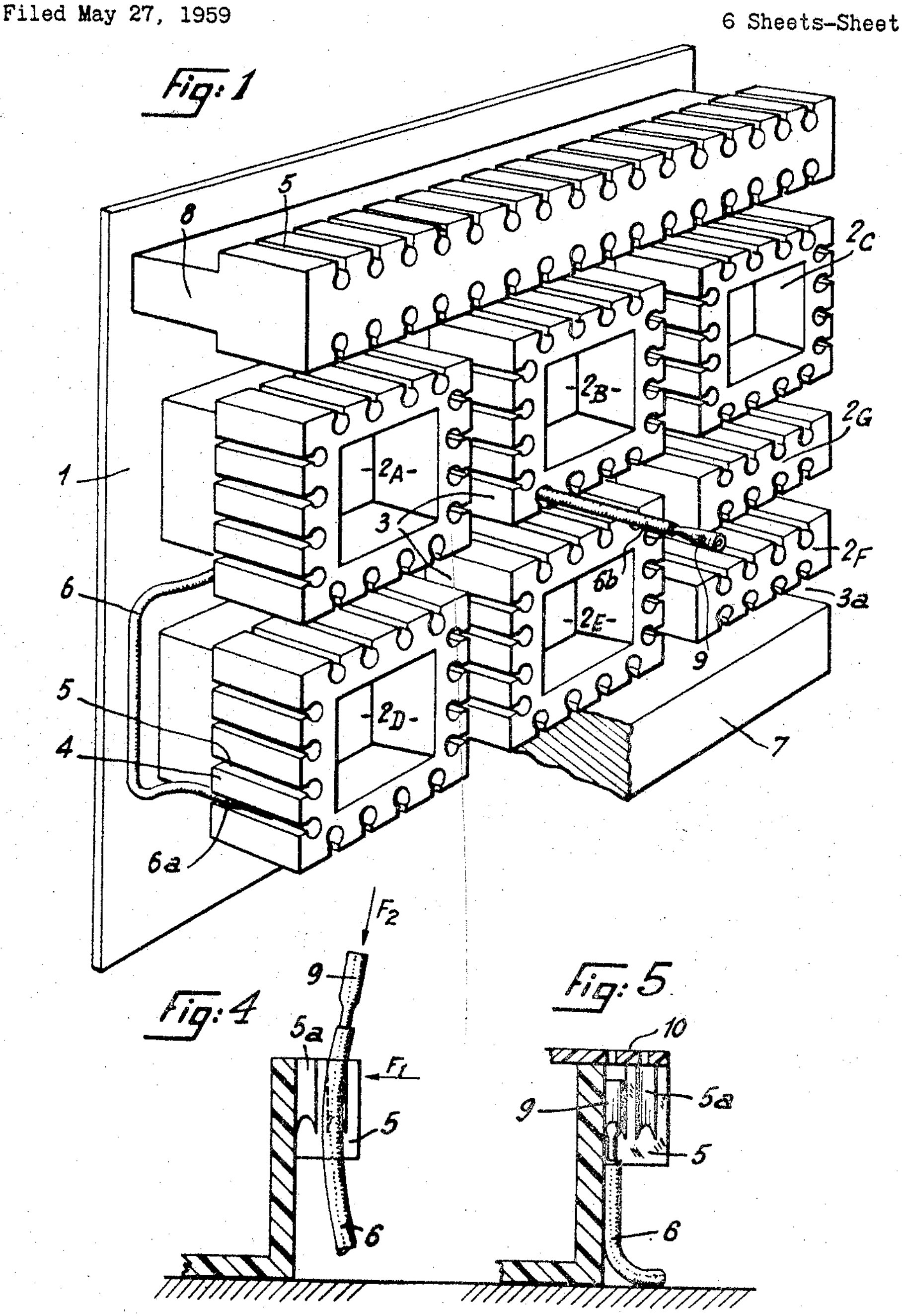
FIG. 1 is a simplified perspective view of a switchboard according to the invention.
FIGS. 4 and 5 are views in section normally to the switchboard panel surface, of the jutting edges or flanges or base elements illustrating the detail of the conductor mounting means.

The switchboard shown in FIG. 1 comprises a flat panel 1 with a number of base blocks, herein the seven base blocks 2A to 2G, secured thereon in a conventional manner. These base blocks are constructed on a modular basis, that is to say their two dimensions on a plane parallel to the panel surface are respectively equal to or are integral multiples of respective moduli. Hence, as shown in the figure, the base members form a kind of regular checquer pattern on the face of the panel, with aligned channels or ducts 3 defined between them extending in two mutually rectangular directions.

Each base member is formed at its top periphery with a jutting edge flange 4 of substantial thickness. Formed in these jutting edges are spaced notches 5 having major dimensions extending normally to the panel 1 and serving to receive connector members such as 9 supported at the ends 6*a* and 6*b* of conductor wires 6. As described later, the connector elements 9 cooperate with complementary connector elements carried by the removable portions of the respective units of apparatus which are removably fittable over the base members.

Thus it will be understood that the lengths of insulated conductor wires 6 which are individually engaged in the restricted portions of the channels 3 defined between two opposed flanges are received in the enlarged bottom portions of the channels. Hence in order to position an interconnecting wire between a selected pair of base blocks, it is simply necessary to pass the wire through a selected sequence of channels 3 which constitute a connecting path between the desired base blocks, and then insert the connector elements at the respective ends of the wire into respective notches such as 5. Part of such a connecting wire 6 is visible at the lower left of the switchboard in FIG. 1 with the connector element 6*a* at one end of it inserted into a side notch of the base block 2D, said wire then extending into and along the channel between the base blocks 2D and 2A.

In the exemplary construction shown, the switchboard further includes peripheral elements 7 in the form of angles, without any notches therein, and defining a peripheral channel 3*a* surrounding the outermost base block, as well as additional T-shaped blocks 8 formed with notches 5 in both opposite jutting long sides thereof, these additional blocks constituting terminal boxes serving for connection of the switchboard with external apparatus.

Figures 2, 3, 6, 7:
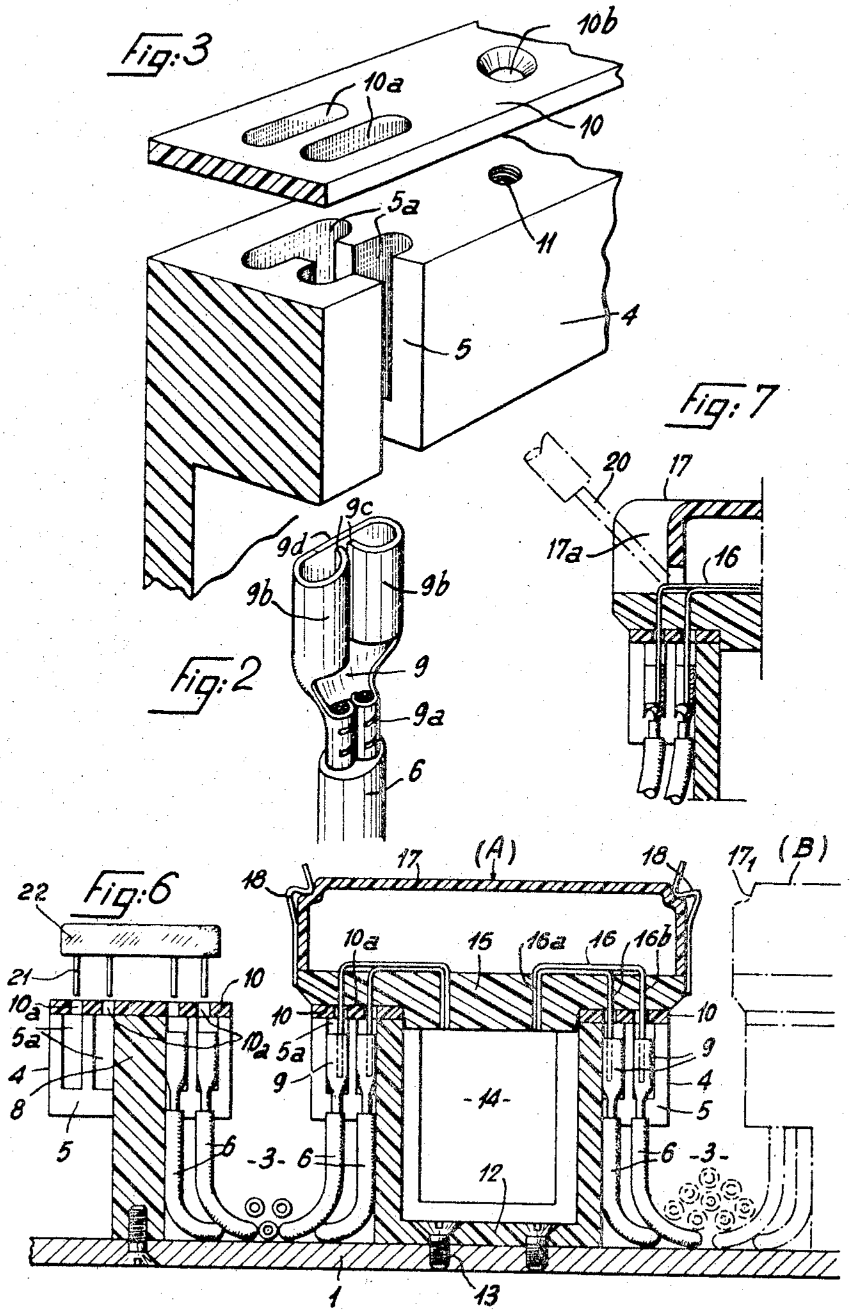
FIG. 2 is a perspective view of a terminal clip of a conductor constituting axially directed connector elements.
FIG. 3 is a perspective view, on an enlarged scale, of part of a projecting edge or flange of a base block with notches for receiving conductors therein.
FIG. 6 is a sectional view of one simple form of a base block member.
FIG. 7 shows a modification of a detail in FIG. 6.

FIGS. 2 to 5 illustrate details of the connector elements 9 which are here shown as comprising clips mounted in general alignment with the wires 6 and adapted to be inserted normally to the panel surface 1 so that a conductive connection can be established with complementary spade- or pin-shaped connector elements. In FIG. 2 the terminal connector clip 9 on a conductor 6 is shown as of conventional construction comprising a terminal spade force-fitting at 9*a* around the conductive core of the insulated conductor 6 and formed at its outer end with a pair of side lugs 9*b* which are bent inwards toward each other so that their adjacent edges 9*c* define a clamp for a flat spade-like connector, the latter being thus engageable between the said edges 9*c* and the substantially flat rear web 9*d* of the spade.

As shown in FIG. 3, the notches 5 would in this case each be formed with at least one locally enlarged portion 5*a* for receiving the clip 9. As shown in FIG. 4, the lapped wire 6 is inserted laterally in the direction indicated by arrow F1 into the notch 5, and the clip 9 is then pushed in the direction of arrow F2 to cause the clip to enter one of the enlargements 5*a* (see FIG. 5). To prevent the clip 9 from thereafter escaping out of its recess the enlarged sections 5*a* are sealed by any overlying plate 10 which is formed with apertures 10*a* through which flat pins are insertable for engagement with the clips. This cover strip 10 may be retained on the base block by any means such as screws received in openings 10*b* of the strip 10 and registering tapped holes 11 in the flange 4.

Preferably, as shown in FIGS. 2 to 5, each notch 5 is formed with two enlarged sections such as 5*a*, so that it should be possible wherever necessary to use a double pin in the form of a cross connector or strap for connecting the apparatus unit mounted on any base block with a power input conductor, which at the same time establishes a shunt or branch connection to some other apparatus unit by way of the conductor received in the other enlargement.

With a connector clip of the type shown in FIGS. 2 to 5, a unit of apparatus can be simply and conveniently hooked up in the manner illustrated in FIG. 6. This figure shows the recessed base block 12 of insulating material secured to the panel 1, e.g. by means of flush-headed screws 13. The base block is formed with the jutting flange 4 as previously described in which the notches 5 are formed receiving the clips carried on the conductors 6. A cover strip 10 in the form of a centrally recessed rectangle is secured over the flange of the base for retaining the clips 9 within the enlargements 5*a*. Then the removable unit of apparatus 14, of any desired type firmly secured to one side of a removable insulating plate 15, is positioned upon the base so that the unit 14 projects into the inner recess of the base.

It will be understood that the apparatus unit 14 may represent any of the many and diverse circuit components used in electrical systems, such as a rectifier, transformer, condenser, and so forth. The unit 14 is connected with the conductors 6 by way of conductor elements 16 which project from the outer face of the removable plate 15 and are each in the general form of a double U having legs extending through said plate 15. One leg 16*a* serves for connection with the unit 14 while the other two 16*b* form projecting lugs adapted to penetrate into engagement with the clips 9. A cover 17 serves to protect the apparent portions of the conductors 16. The cover 17 may be retained in position by any conventional means, such as spring clips 18.

When it is desired to check the operation of the unit 14 the cover 17 may be removed and a suitable feeler tool inserted to determine whether or not electric power is present in the conductors 16. The procedure may be further simplified and the need for removing the cover 17 dispensed with, by so arranging the cover, as shown in FIG. 7, that it presents, adjacent the conductors 16, reentrant portions 17*a* through which a short portion of these conductors are laid bare. Thus the feeler tool 20 (shown in chain lines in FIG. 7) can be manipulated to contact the conductors 16 and ascertain whether they are live without removing the cover plate 17.

Preferably, as shown in FIG. 6, the removable insulating plate 15 has a larger surface area than that of the flanges 4 so that when the part 15 is in place, the restricted portions of the channels 3 will be restricted or covered to a further extent, thus preventing access to the conductors 6 in the channels and preventing the conductors from working their way out of the channels through elasticity.

FIG. 6 further illustrates another unit of apparatus B having its cover $17_1$ positioned in close proximity with the cover 17 of the unit A. The same figure also shows the construction of the previously mentioned terminal box 8. This includes two opposite flanges 4 formed with notches 5 in which are received conductors with their clips 9 some of which are connected with the apparatus units of the switchboard and others are connectable with external apparatus. Thus, a dual cross connector member 21 secured to an insulating base 22 may serve to provide a twofold connection between two pairs of conductors positioned on opposite sides of the box 8, so that removal of the connector member will cut off the switchboard from the external apparatus.

The construction illustrated in FIG. 6 and described above is suitable for use in connection with any of the types of equipment normally used on an electrical switchboard. In case of a defect found to be present in any such unit, its removable section 15 need simply be withdrawn and replaced by a similar section pertaining to a new unit, so that servicing and repairs are greatly simplified.

According to a modification of the invention which appears less desirable than that described but still may have its uses, the base blocks may be formed without any jutting edges of flanges such as 4, and the notches 5 may then be formed directly in a thick edge of the base block. In such case however, the connector elements carried at the ends of the wires 6 would have to be bent so that their ends extending beyond the edges of the base blocks should be normal to the plane of such edges.

Figures 8, 9, 10, 11, 12, 13, 16:
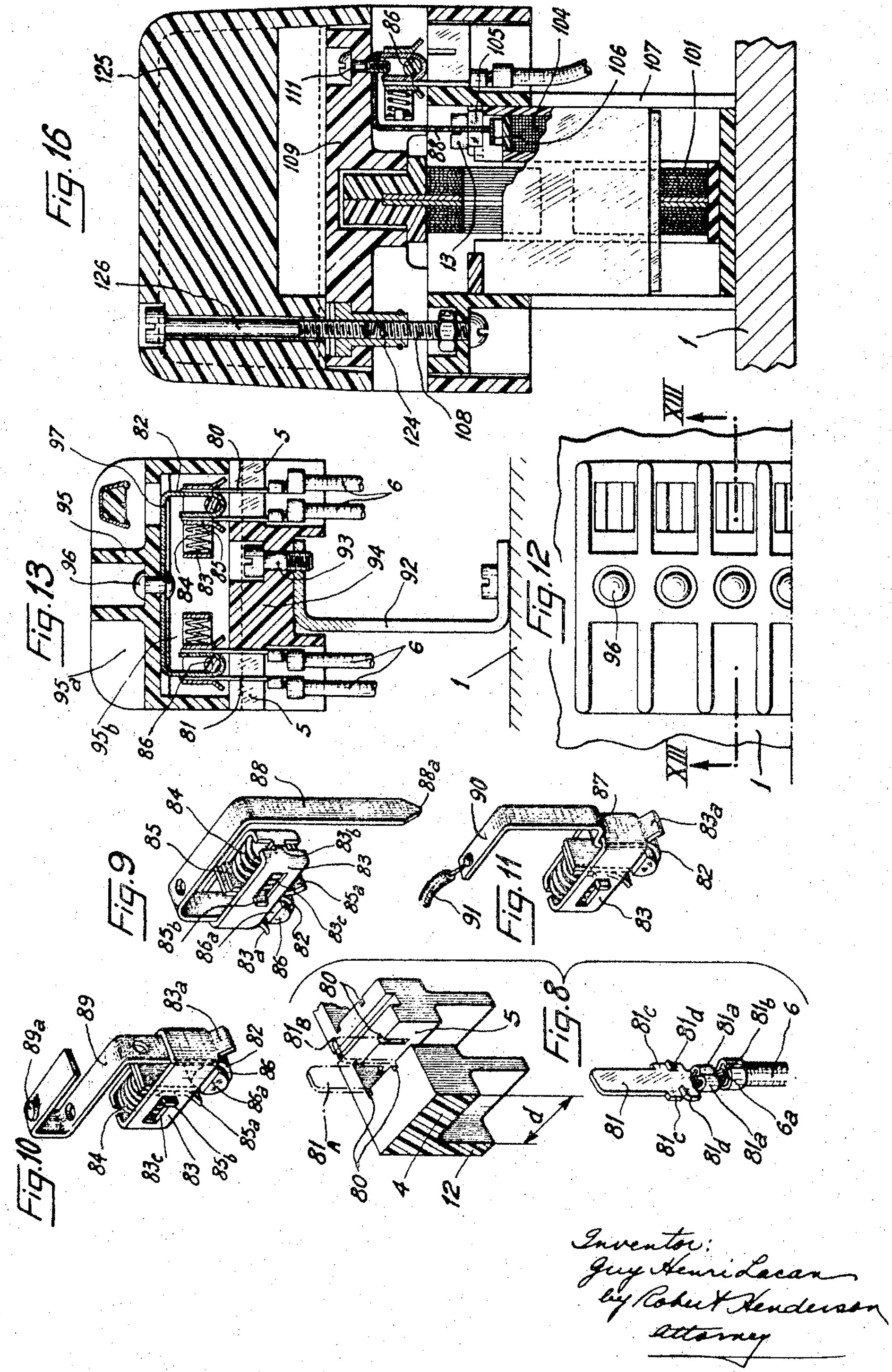
FIG. 8 is a perspective view of a modified base block and a connector element engageable in a notch in a side of said base block.
FIGS. 9, 10 and 11 are exemplary forms of clips adapted to cooperate with connector pins of the type shown in FIG. 8.
FIG. 12 illustrates in plan or front view one example of a switchboard element according to the invention which constitutes a simple terminal box.
FIG. 13 is a section on line XIII—XIII of FIG. 12.
FIGS. 15 and 16 are respective sections on lines XV—XV and XVI—XVI of FIG. 14.

As previously indicated, it is preferable that the connector spades or pins be carried on the conductors and the clips on the removable apparatus units. FIG. 8 illustrates part of a flange 4 of a base block 12 formed with notches 5 adapted for the insertion therein of conductor wires with the connector pins thereon. For this purpose, as shown in FIG. 8 each of the notches 5 has formed in its sides two pairs of opposite recesses of slots 80, and the conductors 6 are fitted at their ends with flat spade-like pins 81 adapted to be fitted into an opposite pair of such slots. Each spade-like pin may be cut out of relatively thin metal foil and presents a first pair of lugs 81*a* near its base adapted to be bent over inwards around the conductive core 6*a* of the conductor 6, and if desired soldered thereover, and another pair of lugs 81*b* adapted to be similarly bent inwards over the insulation of the conductor. The sides of the spade 81 are formed near its base with enlargements in which broad rigid lugs 81*c* are cut out adapted to be fitted into the slots 80, and a further pair of lugs 81*d* which are partly deformed out of the plane of the flat spade to provide spring latching means.

As previously explained with reference to FIGS. 4 and 5, part of the conductor 6 positioned ahead of the pin 81 is inserted sideways into a notch 5 and then the pin is forced in a direction normal to the outer surface of the flange 4 so that its lugs 81*c* and 81*d* will penetrate a pair of facing slots 80. The depth dimension of these slots is so predetermined that it is just able to receive the enlarged portion of each spade 81, so that within each pair of facing slots, the lugs 81*c* will act to retain the related spade 81 in a position normal to the outer face of the flange 4, while the latching lugs 81*d* which have become flattened down into the plane of the spade as the latter was forced into its recess, now tend to project outward and forcefully engage a side of the slots 80 to oppose ready withdrawal of the pin from its recess under a pulling force in a direction reverse from the push that served to insert the pin.

Finally therefore, within each notch such as 5 (FIG. 8) each of the two connector pins or spades will assume a position as at 81A and 81B projecting above the outer face of the flange 4. If as shown in FIG. 8 each notch is formed with two pairs of slots 80, two connector pins may be received therein as shown, and since the lugs 81*b* of the adjacent conductors 6 received in a common notch need not be electrically isolated but may lie in contact with each other, it is only necessary that the width *d* of the flange 4 be about twice as great as the thickness of the portion of conductors 6 surrounded by the lugs 81*b*.

To establish the electrical connection between the unit of apparatus received in a base block 12 with the related conductors 6, a pair of interconnected spring clips of any suitable type may be used to surround the pair of connector pins in a common notch. Thus, as shown in FIGS. 9 to 11, the spring clip essentially comprises a U-shaped part 82 formed from a rigid conductive strip. The spacing between the outer surfaces of the U-part corresponds to the spacing between opposite faces of the pair of spades 81A and 81B received in a common notch. Surrounding this U-shaped part is a stirrup-like member 83 formed from a relatively broad rigid strip bent into a rectangle having one open small end. Each stirrup 83 has a lug 83*a* projecting at an angle from one of its smaller end sides and defining a V-shaped entrance with a related side of the curved portion of the U member 82. Further each stirrup 83 is formed with a pair of opposite lugs 83*b* projecting toward each other from the adjacent ends of the stirrup and bent to extend parallel to the large sides of the rectangular stirrup so as to define a guide for a spring 84 received within the stirrup. The spring 84 is supported at one end against a strip 85 having one of its edges 85*a* on the side remote from the arcuate part of the U 82, bent outward to form another V-shaped entrance. The strip 85 further includes a pair of cutout projections 85*b* movably received in cutouts 83*c* formed in the large sides of stirrup 83.

Thus it will be understood that after the strip 85 and spring 84 have been assembled within the stirrup neither said strip nor said spring can escape. To prevent the strip from slipping bodily along the legs of the U-shaped part (and also to reduce the tendency of this part of the U member from collapsing), a cylindrical pin 86 of insulating material is received in a concave recess of the U part and the lower edge of the stirrup is engaged against this pin. Preferably the pin is formed with flats 86*a* at its ends to improve the engagement thereof with the stirrup.

Figure 15:
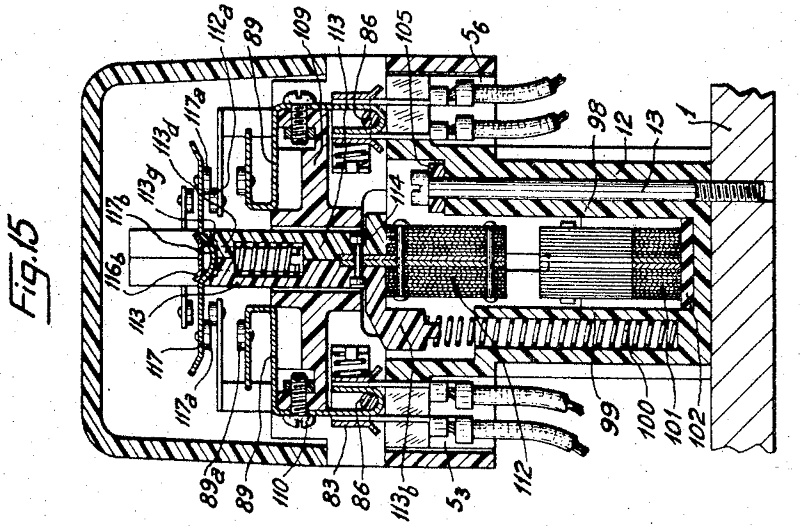
Figure 14:
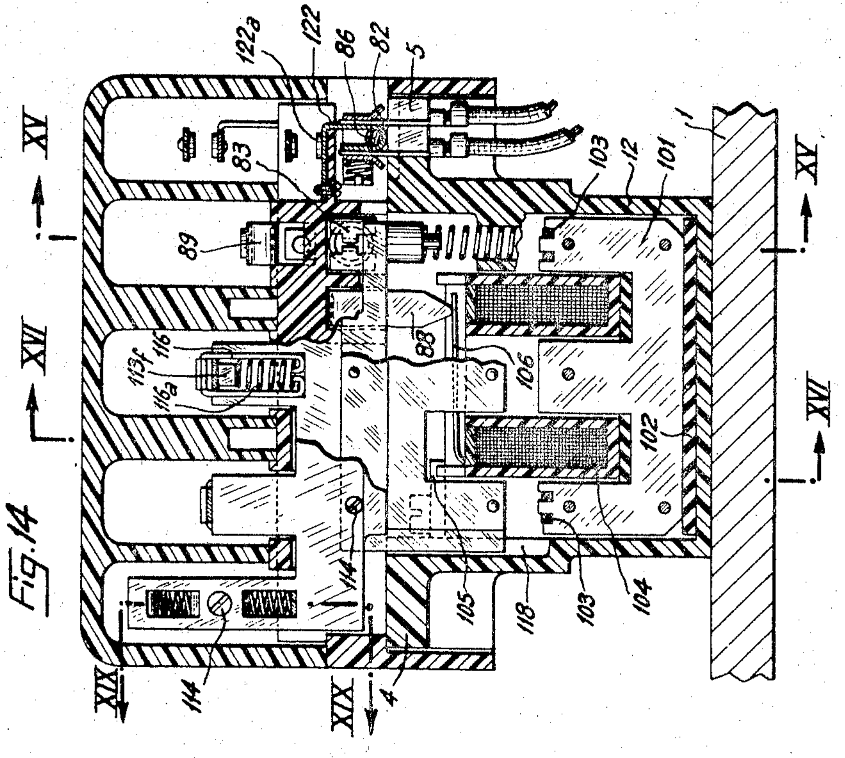
FIG. 14 is a longitudinal sectional view of a contactor forming a switchboard element according to the invention.
Figure 17:
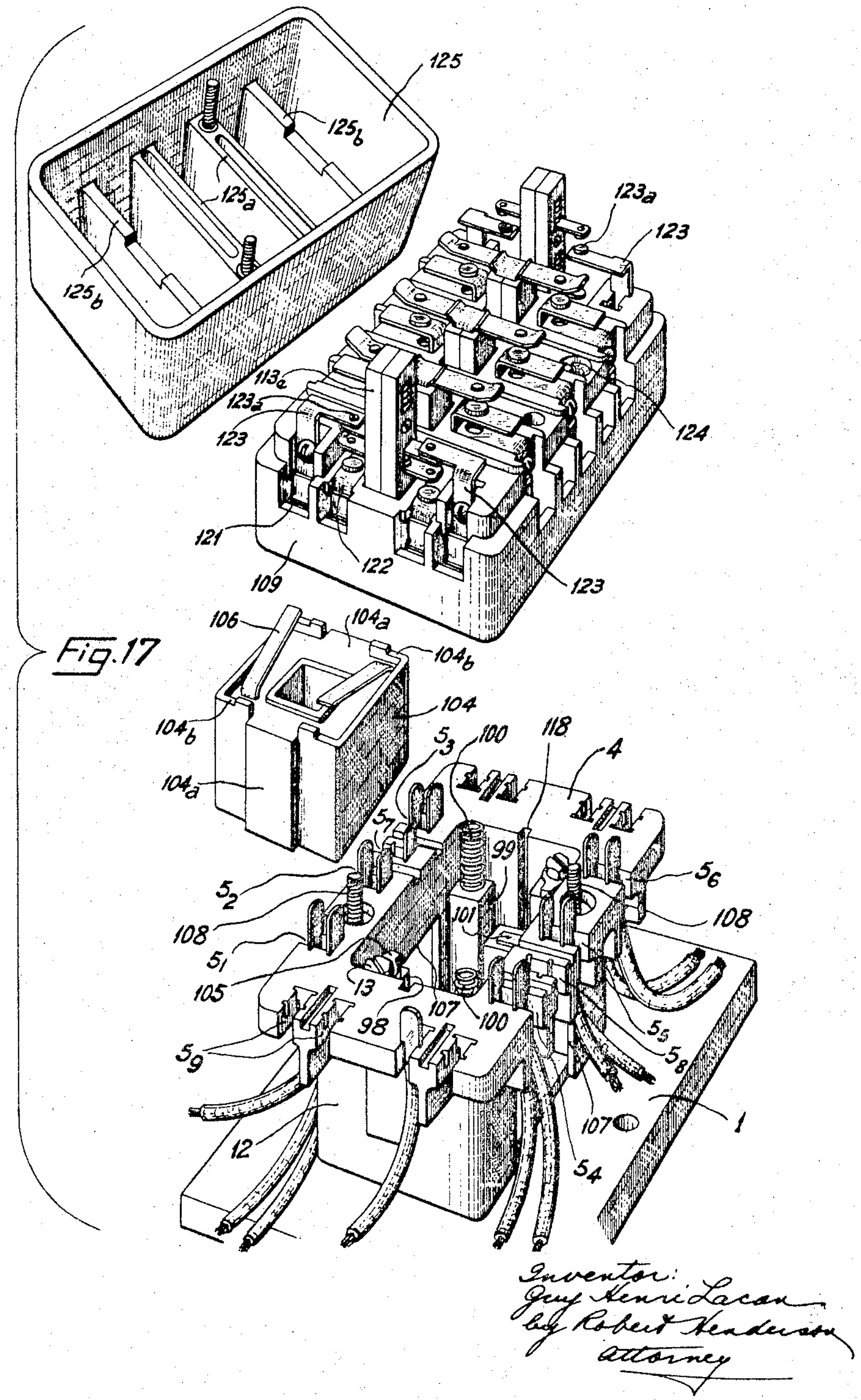
FIG. 17 is an exploded perspective view of the contactor shown in FIGS. 14 to 16.

The above arrangement prevents downward displacement of the stirrup along the U-shaped part, as shown in FIGS. 9 to 11. Similarly to avert an upward displacement of the stirrup, the arrangement may be such, as shown in FIGS. 14 and 15, that the stirrup will have its upper edge abutting against one of the insulating elements carrying the clip. More desirably however, as shown in FIG. 11, the stirrup is retained against upward displacement by abutment against a shouldered portion 87 of the longer leg of the U-shaped part. This long leg constitutes a connecting element of the apparatus unit fitted over the base block. FIGS. 9 to 11 illustrate some exemplary shapes that this longer leg may assume.

In FIG. 9, the long leg 88 is adapted to provide at its end 88*a* an electrical point-contact with a connector spring strip. In FIG. 10, the long leg 89 supports a contact segment 89*a* adapted to cooperate with a movable contact element. In FIG. 11, the long leg 90 has soldered to it a conductor 91 for connection with an electrical circuit element of the apparatus unit supported on the movable section 15 adapted over the base block as shown in FIG. 6 for example.

As indicated earlier, the dual clip just described is engageable with both connector pins 81A and 81B received in a common notch. The arcuate part of the U member 82 owing to its cylindrical shape will tend of its own accord to center itself between the two spaced pins and the latter will respectively slip in between the lugs 83*a* and 85*a* so as to become applied against the outer faces of the U part. In this movement the spring 84 becomes compressed, so that it will press the two pins 81A and 81B between the closed small side of the stirrup and the strip 85 and against the two outer faces of the U member.

FIGS. 12 and 13 illustrate one example of the manner in which the clip and pin connector means described above are applicable to the simple case where the apparatus unit involved is a terminal box.

Secured to the panel 1 is a channel member 92 having secured over its upper flange, with screws 93, an insulating strip 94 which has its opposite longitudinal edges formed with registering sets of notches 5 each of which in turn is internally formed with opposite pairs of slots 80. The sets of conductors 6 which are to be connected through the terminal box are provided with spade-like pins 81 received in the slots of the notches. The cover 95 of the strip is in the form of a recessed member of insulating material formed with sets of parallel spaced transverse partitions including upper or outer partitions 95*a* and lower or inner partitions 95*b*, defining corresponding sets of compartments.

Secured with rivets 96 in each compartment thus defined is a conductive bar or strip 97 having its opposite ends bent at right angles to provide the two U-shaped parts 82 each of which thus constitutes a dual clip associated with a stirrup 83, a spring 84 and a strip 85 in the manner described above.

Thus, the mere act of positioning the cover member with its set of strips 97 will serve to interconnect all the groups of two pairs of conductors 6 inserted in a pair of registering notches 5. Conversely, removal of the cover will effect complete disconnection while such removal will not tend to force the said pins out of their recesses owing to the provision of the lugs 81*d* on each pin as previously explained.

Alternatively, a terminal box may be provided according to the invention with strips 97 having a dual clip at only one end, while the other end may for example be provided with a conventional screw terminal for connection with a conductor having an eye connector. Moreover, the strips 97 may in yet another modification be formed in two separable parts each provided with a dual clip and with both parts interconnected by way of a fuse.

More complex units of apparatus, such as that shown schematically in FIG. 6, for example contactors, may be similarly assembled in a manner largely similar to that described above. Thus, FIGS. 14 to 19 illustrate a relay contactor assembly including a recessed rectangular base block 12 with the jutting flange 4 having the notches 5 formed in it all as earlier described. The base 12 is secured to the panel 1 by way of a pair of screws 13 extending through bosses 98 positioned in the diagonally opposed corners of the rectangular cavity of the base. It will be noted that since the connecting screws are provided inside the base, it is impossible to remove and dismantle the latter unless the removable section of the apparatus has first been separated from the base, thereby first cutting off the electrical connections. The cavity within the base further includes a second and similar pair of bosses 99 in the remaining two corners of the base and adapted to receive springs 100 for restoring the contactor armature.

A three legged E-shaped core 101 is slidably received within the base so as to be positioned between the adjacent ones of bosses 98 and 99, and retained therein at both ends with some clearance. The core rests against a strip 102 of resilient material such as sponge rubber so as to be yieldably supported without transmitting vibrations to the panel 1. This is preferable since the solenoid of the contactor will generally be supplied with alternating energy; for the purpose of this supply the endmost legs of the E-core are fitted with short-circuit rings 103.

Slidably mounted on the central leg of the core is a removable coil winding 104 enclosed within a casing of prismatic form, e.g. cubical, positioned at the center of the cavity in the base between the more remotely spaced pair of bosses 98 and 99. Guide ribs 104*a* of the coil case are adapted to be received between the more closely spaced bosses 98 and 99 to prevent the coil being inadvertently positioned in a direction at right angles from that which it should normally occupy.

The coil together with the core on which it is mounted are retained in position by means of perforated lugs 105 engaged around the shanks of screws 13 and disposed under the heads of the screws (see FIGS. 14, 15 and 17), the ends of said lugs being inserted into the notches 104*b* formed in the upper edges of the coil case 104. The ends of the coil winding are connected with respective spring strips 106 which extend generally parallel to the longer sides of the cavity in the base 12. To facilitate dissipation of heat in the winding side apertures 107 are provided in the base.

Formed in the jutting flanges 4 of the base 12 are as many notches 5 as there are connections to be provided for in the contactor. In the embodiment shown, there are three notches $5_1$, $5_2$, $5_3$ and $5_4$, $5_5$, $5_6$ formed in each of the long sides of the base respectively. Each pair of these notches may for instance correspond with one of the three main conductors of a three-phase contactor device. The two connector pins received in each notch thus make is possible to use double conductors, having a double conducting cross sectional area, for each of such main conductors. The pins received in the notch $5_1$ correspond with the pins received in notch $5_4$ in the opposite edge; notch $5_2$ corresponds with notch $5_5$ for the second conductor and notch $5_3$ with notch $5_6$ for the third conductor. The three notches in each long side which correspond with the main conductors are respectively provided at the center and each end of such sides so as to provide for a maximum length of the leakage path between adjacent main conductors.

Between diagonally opposed notches corresponding to main conductors on each of the long sides there are further provided auxiliary notches $5_7$ and $5_8$ serving to receive energizing input conductors for the winding. Moreover each side has a bolt 108 (FIG. 16) positioned between the remaining two diagonally opposed main notches which bolt engages a hole in the flange 4 for securing the remaining component elements of the contactor.

In each of the smaller sides of the recessed base 12 there are formed four notches $5_9$ which may be used for receiving auxiliary contacts operated by the contactor. In addition to the main circuits, the contactor may thus be used to operate four auxiliary circuits.

The removable section of the contactor described comprises a unit 109 (see FIG. 17) which is fitted over the flange 4 of the base. The unit 109 carries the following sets of elements:

(*a*) The set of dual connector clips for connection with the connector pins received in the notches $5_1$ to $5_9$;

(*b*) The connector elements for the coil winding, each of which also has a dual connector clip secured thereto; and (*c*) The armature of the contactor and its support including the movable contacts.

The fixed contacts provided with clips 89 (see FIG. 15) corresponding with the main conductors, are of the type described above with reference to FIG. 10. Each of these contacts 89, 89*a* is retained in position by means of a screw and nut 110 extending through the edge of unit 109. In this case, as previously indicated, the stirrup 83 of each corresponding clip is retained in position by abutment against the lower face of unit 109.

The winding connecting means which are associated with the notches 57 and 58, are of the type described with reference to FIG. 9. Each is secured by way of a screw 111 (see FIG. 16). The respective ends 88*a* engage the spring strips 106 to provide the desired electrical connections with the winding.

The means used for connecting the windings may alternatively be similar to the means shown in FIG. 11. In such case the conductors 91 would be provided by the ends of the winding. As a general rule, in the case of apparatus of the type that do not include any separable contacts, such as condensers, transformers, rectifiers, and the like, the type of clips shown in FIG. 4 would be especially appropriate.

As regards the clip connectors associated with the notches $5_9$ their description will be easier to follow after the contactor armature has first been described. The armature 112 (FIG. 18) is also of the E type and includes, in its midplane, iron laminations 112*a* of larger size so as to provide an enlarged central section. The armature 112 is assembled with two similar parts 113 of insulating material, which mate with each other while closely surrounding the upper margins of the laminations 112*a*. The parts are assembled with bolts 114 which extend through holes 113*a* in the parts 113 and registering holes 112*b* in armature 112.

Each of the parts 113 is formed laterally, adjacent the core, with a boss 113*b* having a central projecting pin 113*c*. The two bosses and pins which are positioned in diagonally opposed relation after assembly of the mating parts 113, cooperate in centering relationship with the upper ends of the springs 100 (see FIG. 17), so that the movable armature, together with the parts 113, is urged bodily by these springs away from the core.

Each part 113 is formed in its central area at the side directed away from the core, with three recessed legs or extensions 113*d* and with end extensions 113*e*. The extensions 113*d* carry the movable contacts corresponding to the main conductors, and the extensions 113*e* carry the contacts associated with the auxiliary conductors. Formed in the recess of each extension 113*d* is a boss 113*f* which serves as a support for the upper end of a spring 115 (FIG. 14) which is enclosed within a rectangular stirrup 116 formed with bent lugs 116*a* for the retention of the opposite end of the spring.

The movable contact members are each formed by a flat strip 117 (FIGS. 15 and 18) which carries near its opposite ends contact segments 117*a* having a central portion 117*b* which is arcuate. The upper part of the stirrup 16 engages the concave part of the strip 117 by way of a pair of diverging lips 116*b* while the convex side of strip 117 rests upon the edges 113*g* which define the inner walls of the recesses in the extensions 113*d*.

In the deenergized condition of the contactor relay winding 104, which is the position shown in FIG. 15, the springs 100 urge the movable armature away from the core and springs 115 act on the stirrups 116 to press the strips 117 in between the diverging lips 116*b* and the edges 113*g*. In this way the positioning of the strips is positively defined with respect to the parts 113. When however the winding is energized so that the armature is attracted into contact engagement with the core, the pairs of movable contacts 117*a* are moved into engagement with the fixed contacts 89*a* and the contact pressure between the contacts is determined by the springs 115 which are respectively associated with each cooperating pair of stationary and movable contacts.

In addition however, the strip 117 corresponding to each pair of contacts 89*a* associated with a given main conductor, is able when required to deflect angularly by a limited amount with respect to the movable armature, in case both contacts 89*a* are not exactly at the same level, in order to ensure simultaneous contact with both associated contacts 89*a*. During such angular deflection the strip 117 shifts slightly along the corresponding lips 116*b* of the stirrup.

On denergization of the coil and consequent release of the armature, the springs 115 relax as the armature returns to its initial position thereby restoring the convex portions of the strips 117 against the edges 113*g*. Thus, in the idle condition, the strips 117 will retain the same angular relationship with respect to the parts 113 as that assumed by them when the strips were in the active position. This ensures that during subsequent movement of the movable armature towards the core both contacts 117*a* carried by each strip will simultaneously engage both stationary contacts 89*a* respectively associated therewith.

The simultaneous engagement of the movable with the stationary pairs of contacts is made even more reliable by the provision of guiding means for the armature and the parts 113 during their translational movement; the guiding means are provided by cooperation of the side edges of the part 112*a* with grooves 118 (FIGS. 14 and 17) in the base 12.

Each of the end extensions 113*e* is formed with vertically spaced rectangular openings 113*h* which are enlarged or recessed toward that side of the part 113 which mates with the other part 113. Thus the adjacent apertures 113*h* define a recess for housing a pair of elements 119 in the form of cylindrical sectors separated by a spring 120. The auxiliary movable contacts are in the form of strips 121 carrying the contacts 121*a* at their ends and formed with an arcuate central part 121*b* conforming to the cylindrical shape of the sector elements 119.

It is desired that either of two different types of electrical contact operation should be selectively achievable between the conductors terminating in the notches $5_9$ of a pair that is symmetrical to opposite sides of the plane of symmetry of the casing 12. In one type of operation, the contacts are open in the normal or deenergized condition and closed in the energized condition of the contactor unit; in the other type of operation, the contacts are closed in the deenergized condition and open in the energized condition.

Figures 18, 19:
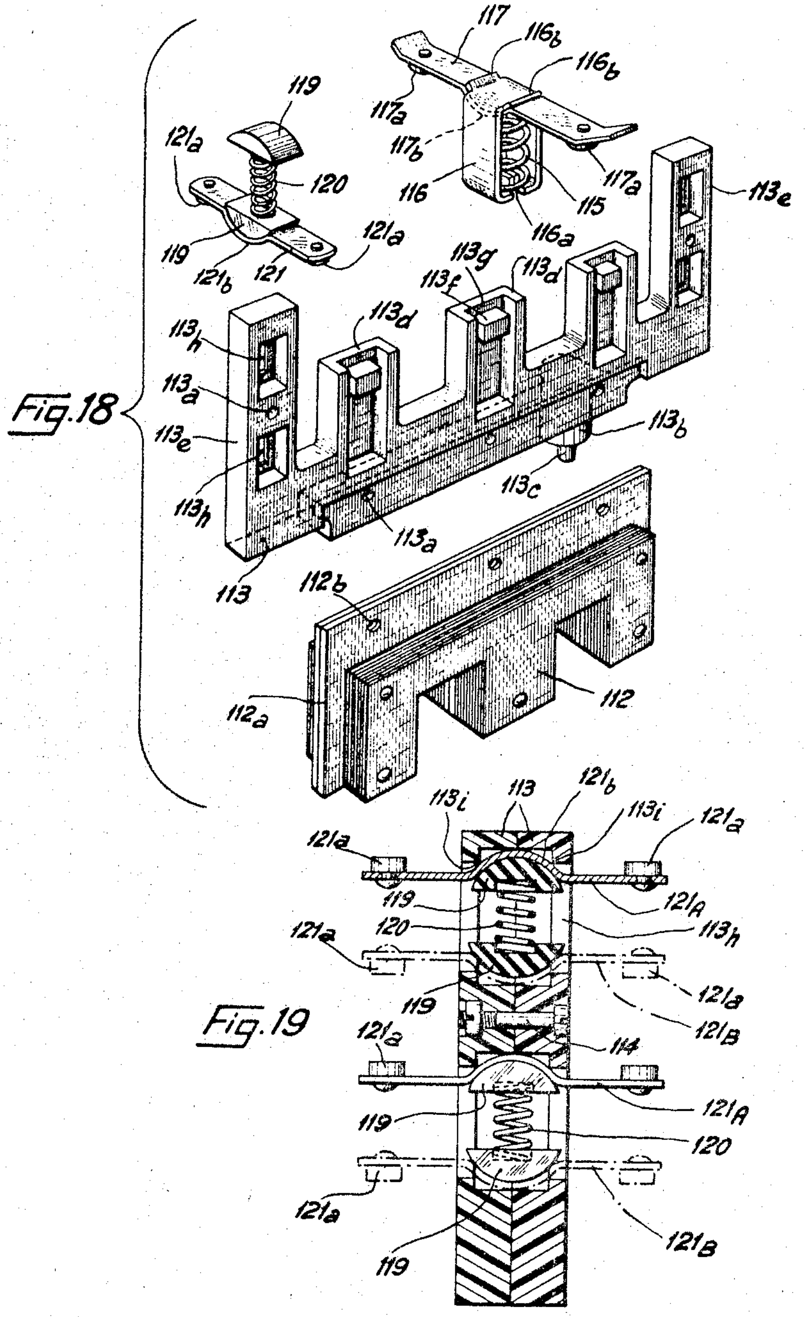
FIG. 18 is a partial exploded view of the movable armature of the contactor.
FIG. 19 is a schematic sectional view on line XIX—XIX of FIG. 14.

For this purpose, the strip within each recess defined by a pair of rectangular apertures 113*h* may be selectively positioned in a position 121A as shown in full lines in FIG. 19, or in the position 121B shown in dotted lines. In either case the curved portion of a strip is applied against one of the sectors 119 and is pressed with its convex side against the edges 113*i* of the openings 113*h* by a spring 120. With the strip in position 121A, its contacts 121*a* are adapted to engage, on upward movement of the armature, with stationary contacts positioned above said contacts 121*a*, the proper contact pressure being provided by spring 120. As the armature moves downward the strip 121 moves out of engagement with the stationary contacts. In this position of the strip therefore, the relay contacts are closed in the normal or deenergized condition of the relay and opened in the energized condition.

With the strip 121 positioned as shown at 121B, it is adapted to cooperate with stationary contacts positioned beneath its own contacts 121*a*, closing the contacts on downward movement of the armature and opening them on upward movement. In this case the auxiliary contacts will be closed in the energized condition and opened in the deenergized condition of the contactor. In either case, owing to the pressure of the springs 120 acting by way of the sectors 119 to apply the strips 121 against the edges 113*i*, a constant angular reltaionship of the strips with respect to the armature is preserved throughout the back and forth movement of the armature.

Due to the provision of the mating recesses in the extensions 113*e* and the possibility of reversing the positions of the strips 121 in said recesses, there can be made selectively available in connection with the auxiliary conductors four normally closed pairs of contacts, or four normally open pairs of contacts, as well as any desired combination of normally closed and normally open pairs of contacts, with a total set of four contact pairs. As an example in the arrangement shown in FIGS. 14 to 17, the contactor has two strips 121 mounted in the lower recess of the extension 113*e* on the left side of the assembly to provide a normally closed and a normally open contacts, while at the right side of the assembly both strips 121 are mounted in the lower part of the recess 113*h* (position 121B in FIG. 19) so that both these strips provide normally open contacts.

The stationary contact elements provided with their dual connector clips corresponding to various possible positions of the strips 121 are so shaped as to retain the stationary contact elements in the positions just described with respect to the strips 121. In particular the clip contact elements 122 disposed in the notches $5_9$ positioned on each side adjacent to the extensions 113*e*, are desirably bent at right angles as shown in FIG. 14 so that their contact plates 122*a* will be positioned below the strips 121 received in the lower recesses at position 121B in FIG. 19. It should be recalled that a contactor device will practically always include at least one normally open contact pair for holding purposes. For other functions contact elements such as 123 (FIG. 17) may be cut out from a plate to the desired shape of a semi-tee, with that leg thereof directed towards the dual clip being bent down at right angles as shown. The contact elements 123*a* of these contacts may be directed upward or downward as the case may be.

The unit 109 carrying the assembly thus described is secured to the base block by means of tubular nuts 124 (FIG. 16) which are threaded around the projecting parts of the bolts 108. After the tubular nuts have been secured in place, all the clips carried by the unit 109 are in engagement with all the connector pins projecting from the base 12, whereupon the unit 109 forms an integral assembly with said base.

Over the unit 109 in turn there is preferably placed a cover 125 of ceramic material or the like, internally formed with the transverse partitions 125*a* and 125*b*. The two central partitions 125*a* which serve to separate from one another the contact elements corresponding to the main conductors are of substantial thickness and are internally recessed to provide a leakage path of maximum length between the main contact elements. The partitions 125*b* serve to separate the auxiliary contacts from the adjacent main contacts. The cover 125 (FIG. 16) is retained in position by a pair of screws 126 which engage the free length of the screw thread of the tubular nuts 124. Thus it is necessary first to remove the hood or cover before it can be possible to remove the unit 109 carrying the connector clips and the stationary and movable contact members.

With the cover in place the stirrups 83 of the dual clips remain apparent at the outer periphery of the unit 109 since the notches in which those clips are received are laterally open. This makes it possible to perform servicing operations, such as checking the presence or absence of voltage at any desired point of the contactor by means of a suitable feeler tool inserted into the notch. For such servicing operations therefore, no dismantling is necessary. Moreover, all those components of the contactor that are susceptible to wear can easily be removed and replaced so that repairs are greatly facilitated.

It will be understood that various modifications may be made in the specific constructions illustrated and described herein without exceeding the scope of the invention.

What I claim is:

1. An electrical switchboard assembly comprising a supporting panel; a base block made of insulating material fixed to said panel, said base block having, along one of its edges and spaced from said panel, a flange of substantial thickness jutting therefrom in substantial parallelism to said panel, said flange having open-sided notches therein, extending substantially perpendicular to said panel, each of said notches having a narrower part at the end thereof nearest to the panel and an enlarged part at the end thereof farthest from the panel; insulated electrical conductors of a thickness enabling them to be laterally inserted into the narrower part of one of said notches; connector portions secured to corresponding ends of said conductors and adapted for disposition within enlarged parts of the notches in interference relation to said narrower notch parts to prevent shifting of the connector portions into said narrower notch parts; retaining means for holding said connector portions in said notches; and a complemental block adapted to be superposed upon said base block and having electrical connector portions adapted to engage the connector portions of said conductors when said complemental block is thus superposed.

2. A switchboard assembly according to claim 1, including a plurality of said base blocks arranged in parallelism to and spaced from each other with said jutting flanges thereof located at adjacent sides of said block; the spaces between said blocks and below said flanges constituting conductor receiving channels and said flanges constituting means for opposing shifting of conductors from within said channels.

3. A switchboard assembly according to claim 2, further including plural complemental blocks superposed on said base blocks and having side portions jutting laterally beyond said flanges to further oppose shifting of conductors from within said channels.

4. A switchboard assembly according to claim 1, said enlarged parts of the notches being open adjacent to their end which is distal from said narrower part to facilitate entry of said connector portions of the conductors thereinto; said assembly further including a cover plate fixable upon said base block in covering relation to said notches at the latter's said open parts to retain said connector portions within said notches, and said cover plate having openings therein permitting extension therethrough of the connector portions of the complemental block into engagement with the connector portions disposed in the notches in the base block.

5. A switchboard assembly according to claim 1, said retaining means comprising resilient latching means effecting coaction between a wall of said enlarged parts of said notches and said connector portions in said base block to hold the latter connector portions in said enlarged parts of the notches.

6. A switchboard assembly according to claim 5, said latching means comprising a resilient tongue on said connector portions in the base block coacting with a recess in an adjacent wall of said notch.

7. A switchboard assembly according to claim 1, said base block having a recess for accommodating associated electrical apparatus therein, and said base block and complemental block substantially enclosing said electrical apparatus.

References Cited in the file of this patent

UNITED STATES PATENTS

| | | |
|---|---|---|
| 1,950,486 | Frank | Mar. 13, 1934 |
| 2,028,717 | Hayden | Jan. 21, 1936 |
| 2,182,847 | Johnson | Dec. 12, 1939 |
| 2,186,813 | Adam | Jan. 9, 1940 |
| 2,281,958 | Snavely | May 5, 1942 |
| 2,427,742 | Peterson | Sept. 23, 1947 |
| 2,706,803 | Templeton | Apr. 19, 1955 |
| 2,793,354 | Heimbach | May 21, 1957 |
| 2,802,189 | Bishop | Aug. 6, 1957 |
| 2,802,972 | Warrington | Aug. 13, 1957 |
| 2,897,410 | Hammerly | July 28, 1959 |
| 2,898,518 | Lynn | Aug. 4, 1959 |
| 2,916,721 | Adams | Dec. 8, 1959 |